Figure 1:
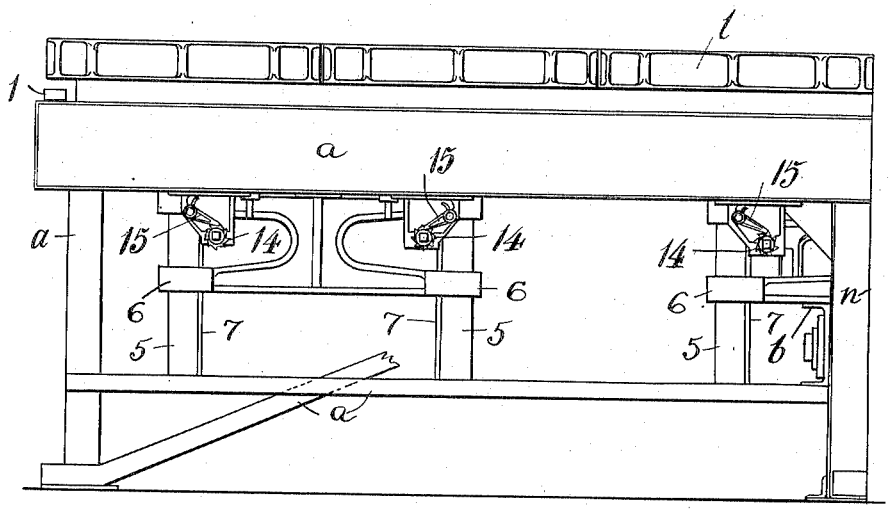
Figure 1A:
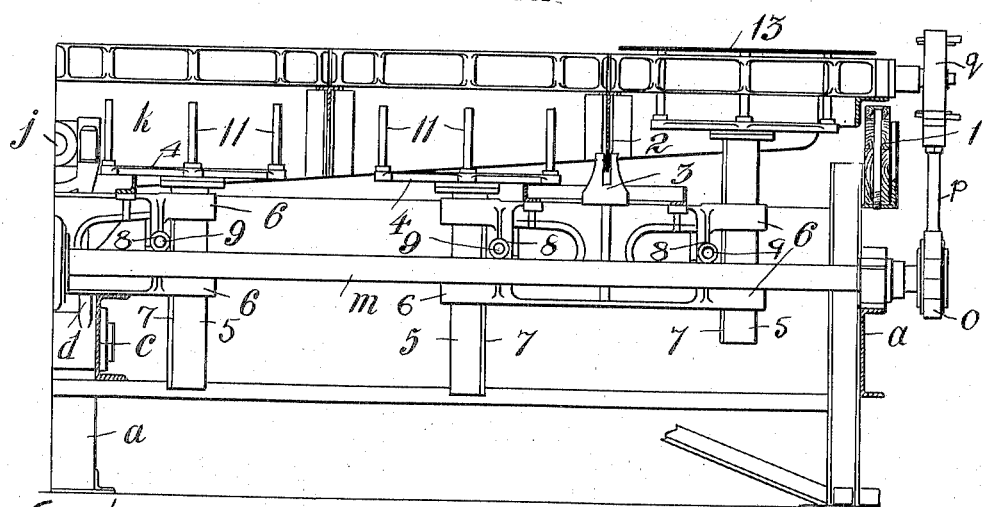

P. B. JAGGER.
PROCESS OF MANUFACTURING CONCRETE SLABS, BEAMS, PIPES, AND OTHER CONCRETE ARTICLES.
APPLICATION FILED FEB. 20, 1907.

967,196. Patented Aug. 16, 1910.
6 SHEETS—SHEET 1.

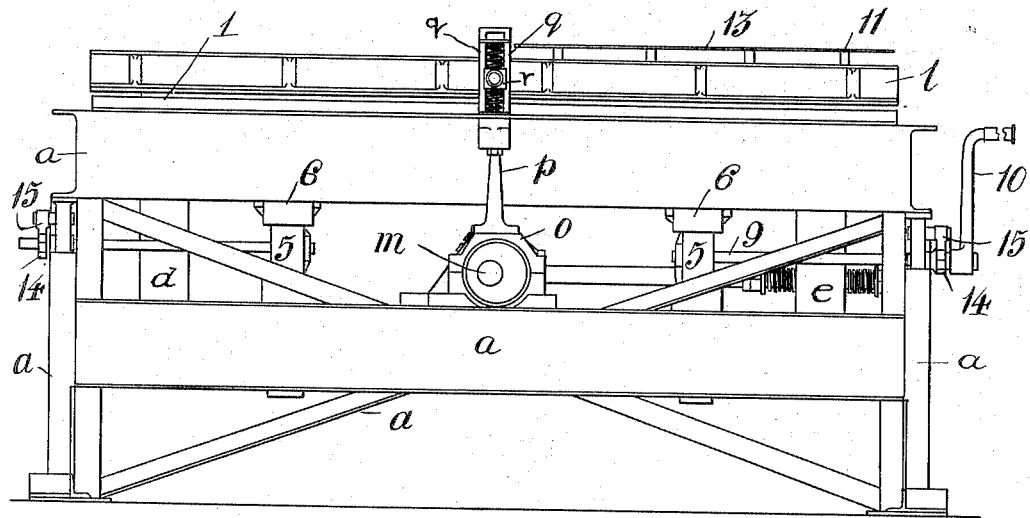
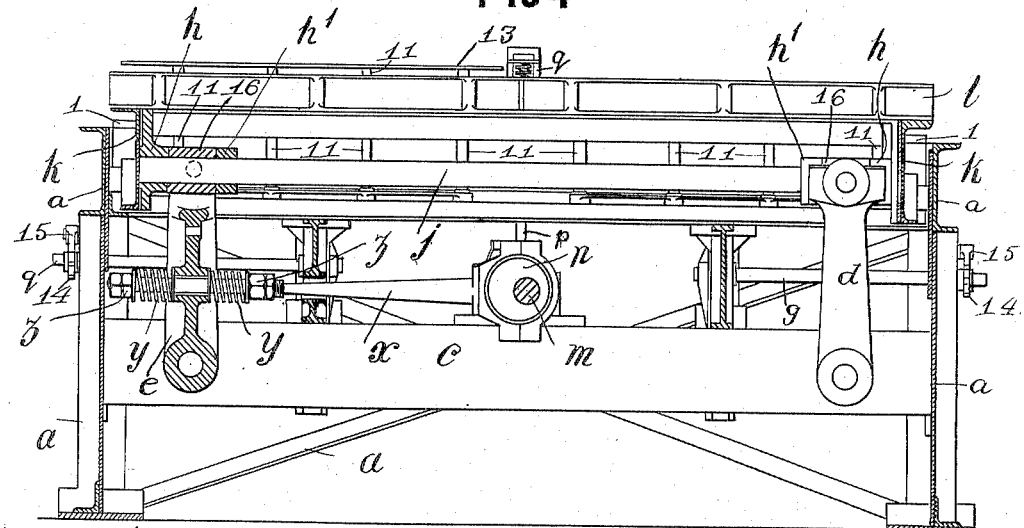

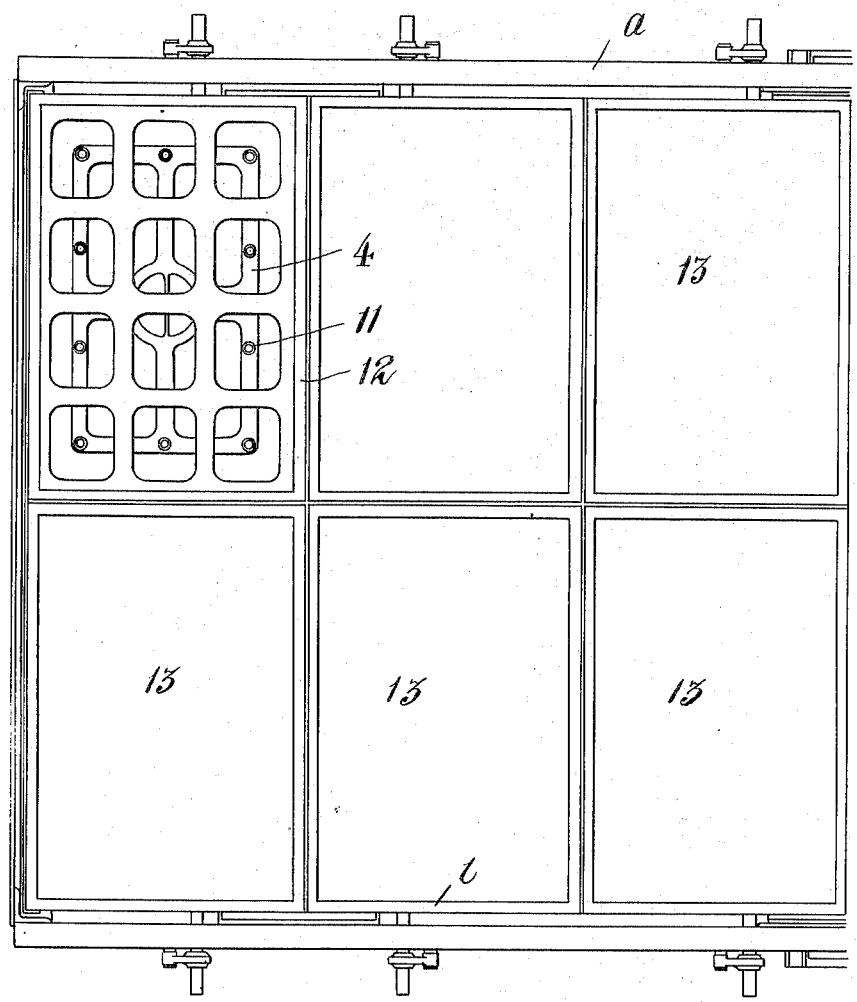

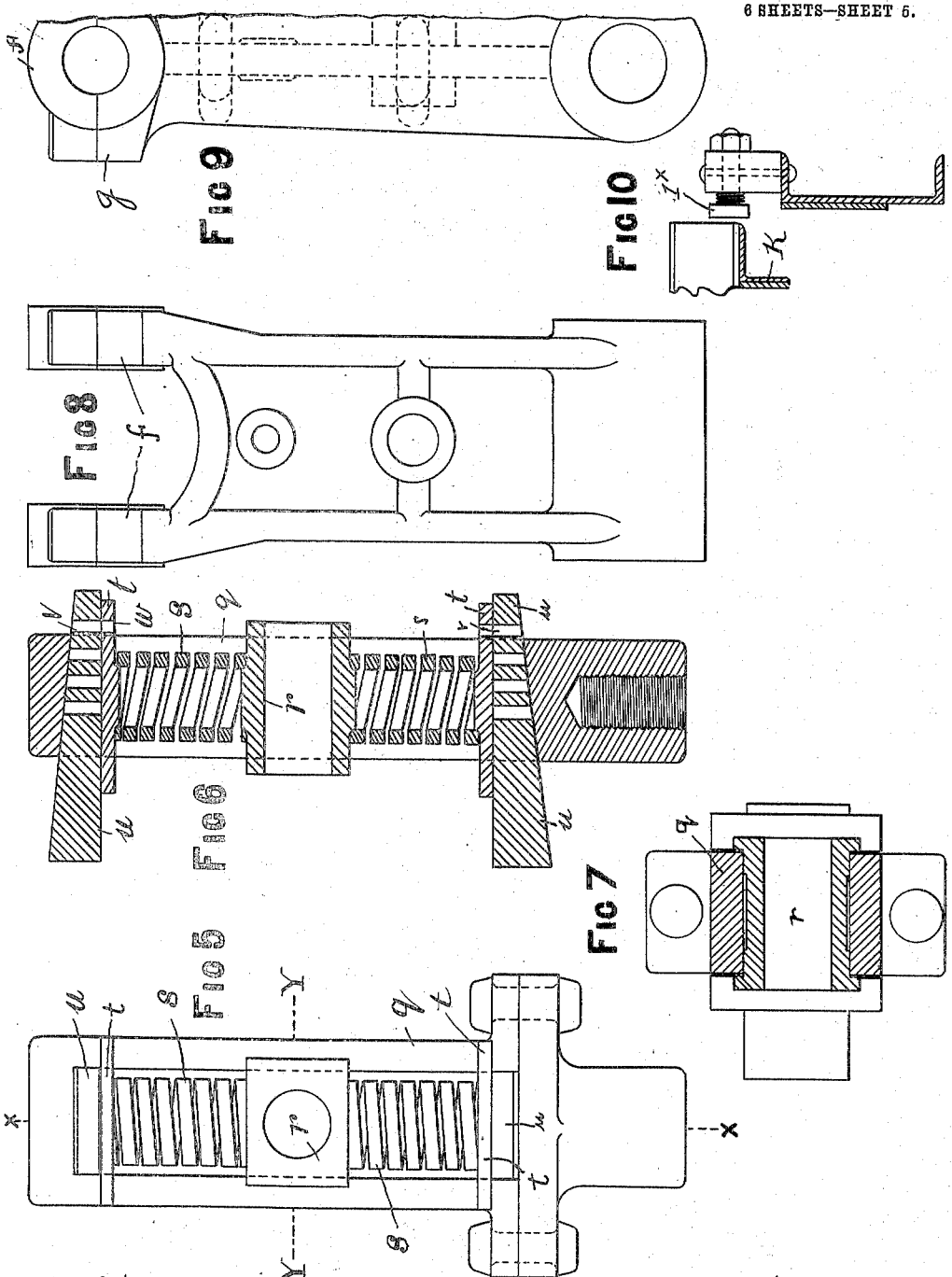

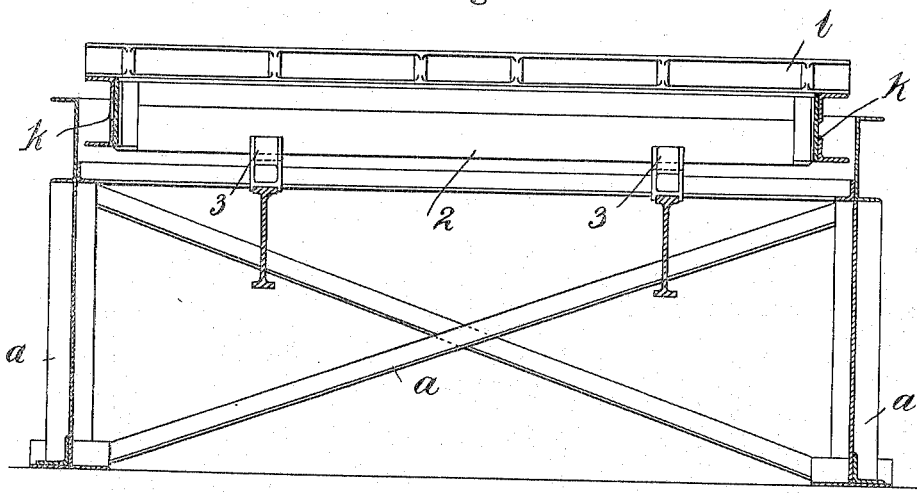

UNITED STATES PATENT OFFICE.

PETER BURD JAGGER, OF LONDON, ENGLAND, ASSIGNOR TO THE IMPROVED CONSTRUCTION COMPANY LIMITED, OF LONDON, ENGLAND.

PROCESS OF MANUFACTURING CONCRETE SLABS, BEAMS, PIPES, AND OTHER CONCRETE ARTICLES.

967,196.

Specification of Letters Patent. Patented Aug. 16, 1910.

Application filed February 20, 1907. Serial No. 358,418.

*To all whom it may concern:*

Be it known that I, PETER BURD JAGGER, a subject of His Majesty the King of Great Britain, and resident of 47 Warwick road, Maida Vale, London, England, have invented certain new and useful Improvements in Processes of Manufacturing Concrete Slabs, Beams, Pipes, and other Concrete Articles, and of which the following is a specification.

This invention relates to a new or improved process of and means for manufacturing concrete slabs, beams pipes, tiles, and other concrete articles which may either be reinforced or unreinforced as desired.

In the ramming, pressing or jiggling processes for the manufacture of concrete slabs, etc., hitherto commercially used or proposed, the great difficulties presented are the elimination of all air voids and excess moisture, and the obtaining of perfect density and solidification with even distribution of the material. Moreover for economical construction the greater the displacement of the mortar body by the use of the larger aggregates the better, but there is limitation to this in the manufacture of concrete by hydraulic or other pressure machinery or by hand ramming, as it is impossible to compress with any economy unles the aggregates are of a small uniform size.

With the process according to my invention not only can all sizes of aggregates required for economy be used, but a steady settling solidification of the material with even distribution of the aggregate is effected over all the surface of the table simultaneously, and all air voids and excess moisture are eliminated, and perfect density and solidification obtained, the result being an article of great strength and durability.

According to my process, the plastic concrete while in the mold is subjected to both a substantially horizontal reciprocating motion and a suddenly arrested rocking motion in a vertical plane the direction of which is at right angles to the direction of said reciprocating motion.

The following is an example of a block actually made by my process, one part of Portland cement was taken and seven parts of sand and uneven broken stone, the latter in sizes from a small shot to pieces passing through a $2\frac{1}{2}''$ ring the whole mixed by machine and sufficient water added to make it of the consistency of moist sugar, then deposited in the molds on the table hereinafter described) and the table worked for a period of about twenty minutes, which produced a block having maximum density, compressive and tensile strength. The time necessary for the operation may be varied considerably according to the article to be produced but the successful working of the process will offer no difficulty to those skilled in the manufacture of such articles.

For carrying out the process I will describe with the aid of the accompanying drawings a construction of machine which I have found to work well.

Figure 3A:
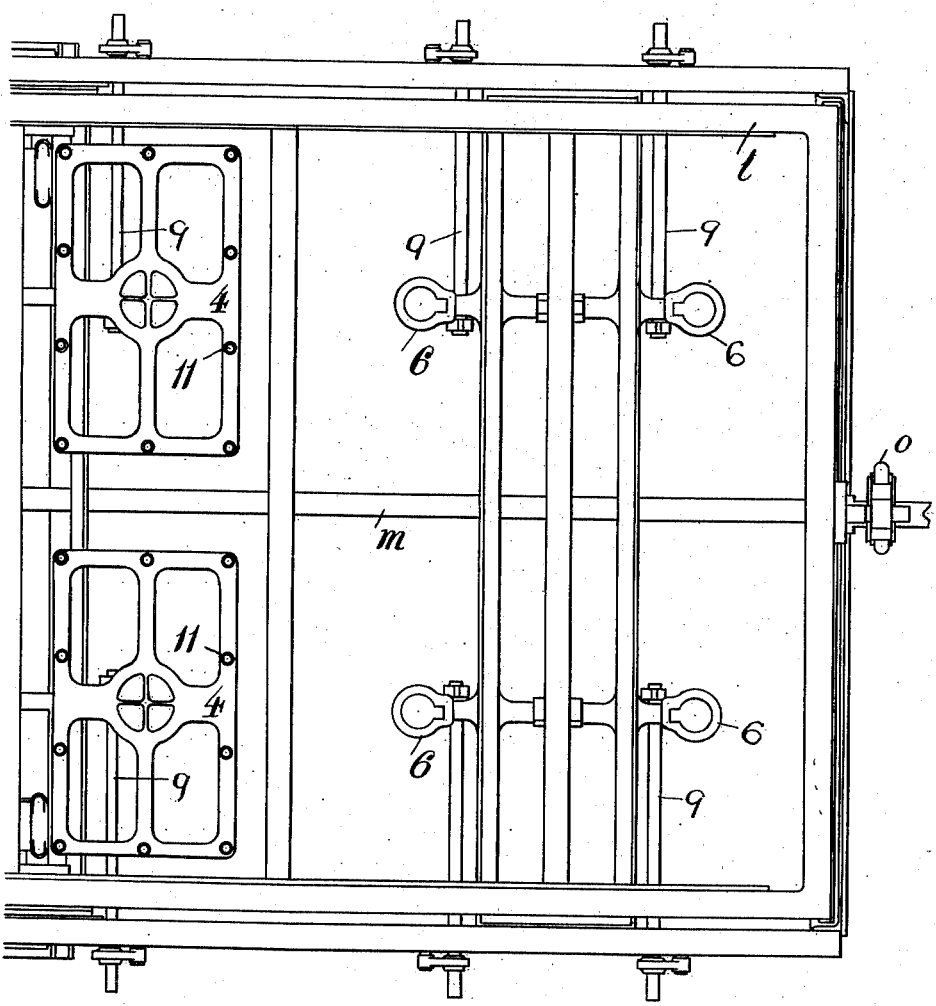

Of the drawings, Figures 1—1ª Sheet 1 is a part side and part sectional elevation of the machine; Fig. 2 is an end view thereof; Figs. 3—3ª is a plan view of the machine with some of the mold boxes removed for disclosing the elevating tables, some of the latter being also removed for disclosing the guides therefor; Fig. 4 is a transverse section of the machine; Fig. 5, is a front view of an elastic eccentric rod head which I prefer to employ; Figs. 6 and 7 being sectional views of such elastic head taken respectively upon the lines X X and Y Y Fig. 5; Figs. 8 and 9 are respectively front and side elevations of one of a pair of forked levers he•einafter referred to, while Fig. 10 is a detail view also to be hereinafter referred to, and Fig. 11 is a detail view of the guides for the table.

Referring to Figs. 1—4, $a$ designates a supporting frame preferably composed of a number of uprights and cross members. Between channel irons $b$ $c$ fixed to the central uprights and running transverse of the frame are fulcrumed at their lower ends a pair of levers $d$ $e$, which as shown in Figs. 8 and 9, are forked at their upper ends $f$. The ends $f$ are provided with caps $g$ and are bored to receive trunnions on blocks 16 which are bored to receive and support a shaft $j$. Upon the shaft $j$ is centrally supported a mold, table or platform $l$ by means of bearings $h$ secured to the depending sides $k$ of the platform, table or mold. The levers $d$, $e$, are so located that the blocks 16 may bear on their outer faces against the bearings $h$ and collars $h'$ are provided on the shaft $j$ as bearings for the inner faces of the trunnion block 16. Thus by rocking one or both of the levers $d$, $e$, through a small arc the table $l$ is subjected to a substantially horizontal reciprocating motion while the table may be rocked about the shaft $j$, that is to say, in a vertical plane the direction of which is at right angles to the direction of the said reciprocating motion.

In order to provide means for rocking the levers $d$, $e$, and rocking the table $l$ about the shaft $j$ lengthwise and preferably centrally of the frame $a$ is journaled a shaft $m$ suitably arranged to be driven from any available source of power. Upon the shaft are fixed at each end thereof eccentrics $n$ and $o$. The eccentric $n$ is connected to one of the forked levers $(e)$ and the eccentric $o$ is connected to one end of the table $l$ for the purpose when the shaft $m$ is rotated of simultaneously imparting a lateral reciprocating movement and a rocking motion to the table $l$.

The connection of either or both of the eccentrics $n$ and $o$ to the lever $(e)$ and the table $l$ may and preferably is arranged an elastic one. As shown in Figs. 5, 6, and 7 and more particularly for the connection of the eccentric $o$ to one end of the table $l$, I provide the eccentric rod $p$ with a slotted head $q$, and in sliding engagement with such head is arranged a bush $r$ to which the table may be suitably attached. This bush $r$ is normally held in position by springs $s$ $s$, which at their one or inner ends bear against the bush and at their other or outer ends bear against plates $t$ $t$ also arranged in sliding engagement with the head $q$, so that by means of inclined cotter pins or wedges $u$ $u$ they may be adjusted in position for varying the force of the springs $s$ $s$, holes $v$ $w$ being formed in the wedges $u$ $u$ and plates $t$ $t$ for receiving pins or the like for retaining the wedges when driven to the required position.

For the elastic connection of the eccentric $n$ with the lever $e$, I have found it convenient as shown in Fig. 4 to pass the head of the eccentric rod $x$ through the lever and interpose springs $y$ $y$ between the latter and adjusting screw nuts $z$ $z$, although if desired the form of elastic head described with reference to Figs. 5–7 may in this case also be adopted. The lever $d$ may also be connected to the same eccentric as the lever $e$ or it may be connected to an independent eccentric.

At each end of the supporting frame as shown at the right hand side of Fig. 1 are arranged a number of preferably wooden concussion blocks 1, upon which the table strikes as it is rocked, i. e., a vertical blow is given to each end of the table alternately. For preventing any straining action upon the horizontal rod $x$, I prefer to set the eccentrics $n$ and $o$ upon the shaft $m$ so that the eccentric $n$ will be crossing point of no travel when the table strikes against the blocks 1.

In addition to the vertical blows, side blows may also be imparted to the table $l$. To effect this the table may be arranged to strike laterally against adjustable spring controlled rods or bolts $1^x$ carried by the supporting frame substantially as shown in Fig. 10.

To avoid any swiveling action of the table this may be provided, as shown in Fig. 1, with a number of guide plates or the like 2 working in guides 3 fixed to the supporting frame.

In operation, the molds suitable for the articles to be produced having been positioned upon the table $l$ and filled with the plastic concrete material, rotary motion is imparted to the shaft $m$. This by means of the eccentrics $n$ and $o$ imparts an oscillatory movement both to the lever $e$ or levers $d$ $e$ and the table $l$ about their turning points. The table $l$ is thereby simultaneously laterally reciprocated and rocked lengthwise of the machine, and a vertical blow is given alternately at each end of the table by the alternate contact of said ends against the blocks 1. The shock thus imparted at each end of the table gives the desired vibration through the machine, and in conjunction with the rocking and lateral reciprocating motion, and may be side blows also, keeps the longitudinal movement of the material steady.

By my invention therefore I am able to effect a steady settling solidification of the material over all the surface of the table, and not only are all air voids and excess moisture eliminated and stratification obviated, but by the automatic adjustment of every particle of the material in its precise position, a maximum density of the material throughout is produced, without any pressure whatsoever, while moreover a great saving is attained in the time required for the articles to thoroughly set ready for use.

It may here be observed that the provision of the elastic head to the eccentric rod or rods prevents or considerably reduces any straining action upon the driving gear and allows the table to overrun and thus throw as much vibration to the center of the table as there is at the ends thereof.

As shown in the example of the machine illustrated, elevating gear may be provided beneath the supporting frame for lifting the concrete articles (where the shape of these permit) out of the mold boxes.

A suitable arrangement of such gear consists of plates 4 carried by rods 5 which work in brackets 6 connected to the frame $a$. The rods 5 are each provided with a rack 7 which is adapted to be operated by a pinion 8 fixed upon a spindle 9 and adapted to be rotated by a handle 10 (Fig. 2).

The plates 4 have a number of upwardly extending fingers 11 adapted when the rods 5 are raised to pass through the bottom of the table l and the mold boxes 12 (in this case provided with removable plates 13 as false bottoms), and raise the plates 13 as shown in Figs. 1 and 2, so that for example a traveling trolley can be run over the table to pick up the plates with the formed articles thereon, locking means such as ratchet wheels 14 and pawls 15 being provided to keep the rods 5 raised as long as required.

As a modification, the table may be arranged at the ground level, so that a trolley or traveling support carrying the mold box or boxes may be run thereon, and such trolley or the like may be held on the table so that it has no movement independent of the latter, or it may be allowed a certain freedom to move backward and forward upon the table as this is operated as hereinbefore described.

I wish it understood I define the term concrete articles as those in which separate particles are formed into a mass or solid body.

Having now described my invention what I claim as new and desire to secure by Letters Patent is:—

1. A process for manufacturing concrete articles consisting in subjecting the plastic concrete while in the mold to both a substantially horizontal reciprocating motion and a suddenly arrested rocking motion in a vertical plane, the direction of which is at right angles to the direction of said reciprocating motion.

2. A process for manufacturing concrete articles consisting in subjecting the plastic concrete while in the mold to both a substantially horizontal reciprocating motion and a suddenly arrested rocking motion in a vertical plane, the direction of which is at right angles to the direction of said reciprocating motion while at the same time the mold or table is subjected to horizontal blows.

3. A process for manufacturing concrete articles consisting in subjecting the plastic concrete while in the mold simultaneously to a rocking movement and to a horizontal reciprocating movement, the direction of which is transverse of the plane of said rocking movement, while at the same time the mold or table is subjected to blows.

4. A process for manufacturing concrete articles consisting in subjecting the plastic concrete while in the mold simultaneously to a rocking movement, a horizontal reciprocating movement, the direction of which is transverse of the plane of said rocking movement, while at the same time the mold or table is subjected to vertical and horizontal blows.

5. A process for manufacturing concrete articles consisting in subjecting the plastic concrete while in the mold simultaneously to a suddenly arrested rocking motion about a central axis and a substantially horizontal reciprocating motion the direction of which is parallel to said axis.

6. A process for manufacturing concrete articles consisting in subjecting the plastic concrete while in the mold simultaneously to a suddenly arrested rocking motion about a central axis and a substantially horizontal reciprocating motion the direction of which is parallel to said axis while at the same time the mold or table is subjected to horizontal blows.

In witness whereof I have hereunto set my hand in presence of two witnesses.

PETER BURD JAGGER.

Witnesses:
HENRY CONRAD HEIDE,
H. D. JAMESON.